F. A. ISAACSON.
LOCOMOTIVE TRUCK.
APPLICATION FILED AUG. 15, 1917.
1,272,450.
Patented July 16, 1918.
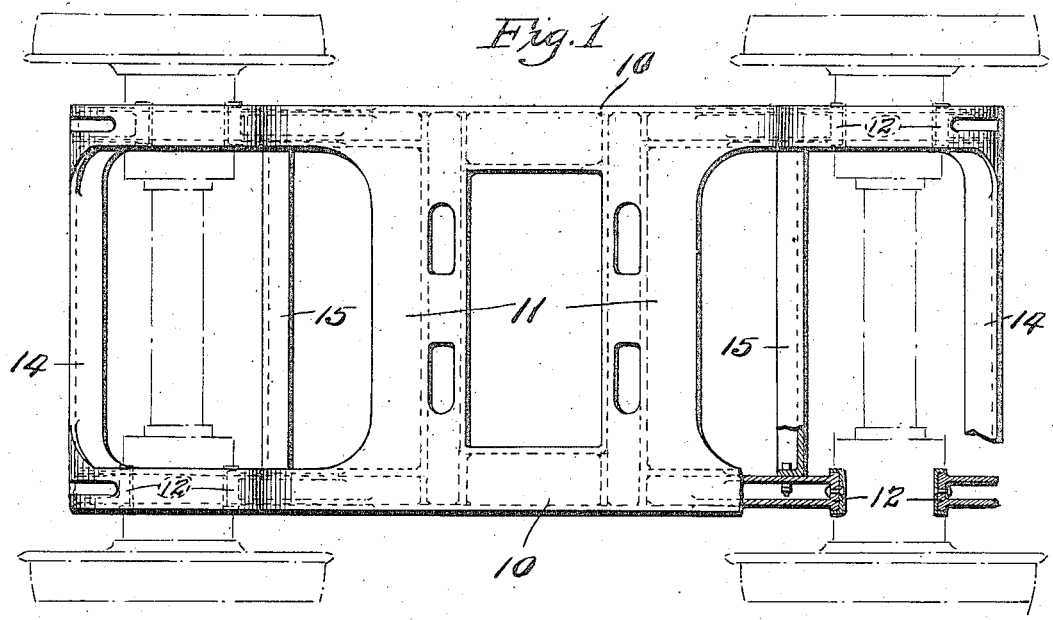
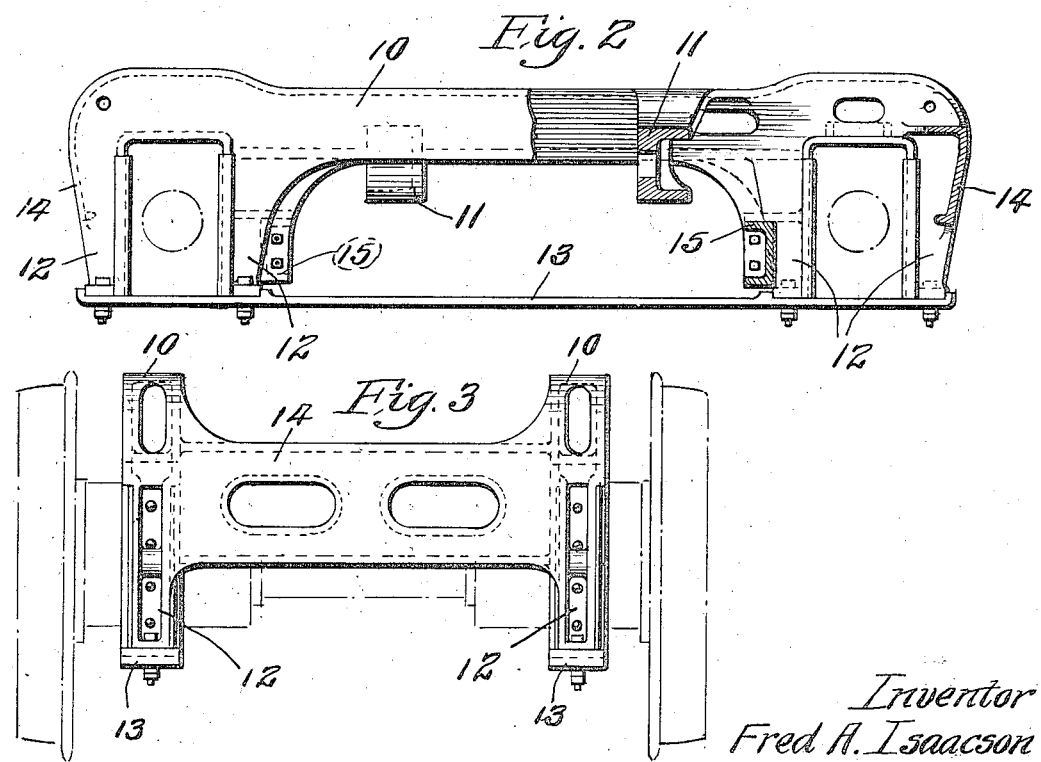
Inventor
Fred A. Isaacson

UNITED STATES PATENT OFFICE.

FRED A. ISAACSON, OF TOPEKA, KANSAS.

LOCOMOTIVE-TRUCK.

1,272,450.    Specification of Letters Patent.   Patented July 16, 1918.

Application filed August 15, 1917. Serial No. 186,410.

*To all whom it may concern:*

Be it known that I, FRED A. ISAACSON, a citizen of the United States, residing at Topeka, Kansas, have invented a certain new and useful Improvement in Locomotive-Trucks, of which the following is a full, clear, and exact description, such as will enable others skilled in the art to which it appertains to make and use the same, reference being had to the accompanying drawings, forming part of this specification.

My invention relates to a locomotive truck, the principal objects of my invention being to generally improve upon and simplify the existing types of four wheel trucks; to provide a truck having a frame wherein the principal members are integrally formed, thereby insuring great strength and rigidity of structure and at the same time eliminating the time, labor and consequent expense involved in assembling a fabricated structure; to provide a truck wherein the pedestal jaws are formed integral with the side members of the frame, and further, to arrange transversely disposed tie members between the corresponding pedestals, thereby enhancing the general strength and rigidity of the entire frame structure.

With the foregoing and other objects in view, my invention consists in certain novel features of construction and arrangement of parts, hereinafter more fully described and claimed, and illustrated in the accompanying drawings, in which—

Figure 1 is a plan view of a locomotive truck of my improved construction, a portion thereof being shown in horizontal section;

Fig. 2 is a side elevational view of the truck with a portion thereof in vertical section;

Fig. 3 is an end view of the truck.

Referring by numerals to the accompanying drawings, 10, 10, designate the side members or wheel pieces of the truck frame, the same being of any desired shape in cross section, though preferably hollow, and connecting the central portions of said wheel pieces are transom members 11, which are spaced a suitable distance apart.

Formed integral with and depending from the end portions of the side members or wheel pieces 10 are pedestal jaws 12, arranged in pairs, and secured in any suitable manner to the lower ends of the jaws of each rail or wheel piece and underlying the journal box openings between said jaws are tie bars 13.

The outer pedestals are connected to each other transversely of the frame by integrally formed end rails 14, the same being of any desired shape in cross section, preferably channels with inwardly presented flanges. The inner pedestals are connected to each other, transversely of the frame, by separately formed rails 15, the ends thereof being secured to the jaws in any suitable manner, preferably by means of bolts or rivets.

By forming the transoms 11 and end rails 14 integral with the wheel pieces 10 and by forming the end rails 14 integral with the outer pedestal jaws 12, a very strong and substantial structure is provided which is well able to resist all ordinary service shocks and vibration. Such construction also materially reduces the number of joints in the frame, and in this connection it will be understood that joints in a structure of this character are liable to open or become loose as a result of constant vibration in service. Furthermore, the integral construction eliminates considerable machine work, and likewise, the time and labor involved in setting the necessary bolts and rivets for a truck frame of assembled or fabricated structure.

A locomotive truck of my improved construction is comparatively simple, can be easily manufactured, meets the M. C. B. requirements and provides a very desirable and effective piece of equipment for the present types of locomotives.

It will be readily understood that minor changes in the size, form and construction of the various parts of my improved locomotive truck can be made and substituted for those herein shown and described, without departing from the spirit of my invention, the scope of which is set forth in the appended claims.

I claim:

1. A locomotive truck having a frame comprising wheel pieces, transom members formed integral therewith, pedestal jaws formed integral with said wheel pieces, end rails formed integral with and connecting the outer ones of the pedestals at both ends of said frame, and separable rails connecting the inner ones of the pedestals.

2. A locomotive truck having a frame comprising wheel pieces, transom members formed integral therewith, pedestal jaws integral with the end portions of said wheel pieces, and rails connecting both the members of the pairs of pedestals transversely of the truck.

3. A locomotive truck frame having integrally connected wheel pieces, pedestals thereon, rails integral with and connecting the outer members of the pedestals, and rails connecting the inner members of the pedestals transversely of the truck.

4. In a locomotive truck, a frame, having a pair of connected wheel pieces, pedestal jaws formed integral with said wheel pieces, end rails formed integral with and connecting the outer ones of the pedestals at both ends of the frame, and transversely disposed rails detachably connected to the inner ones of the pedestals.

In testimony whereof I hereunto affix my signature this 31 day of July, 1917.

FRED A. ISAACSON.

Witnesses:
J. G. McENTYRE,
F. W. SEMON.